US005581243A

United States Patent [19]

Ouellette et al.

[11] Patent Number: 5,581,243
[45] Date of Patent: Dec. 3, 1996

[54] METHOD AND APPARATUS FOR DISPLAYING SIMULATED KEYBOARDS ON TOUCH-SENSITIVE DISPLAYS

[75] Inventors: Daniel Ouellette, St. Luc; Sylvain D'Auteuil, Pierrefonds, both of Canada

[73] Assignee: Microslate Inc., Canada

[21] Appl. No.: 534,454

[22] Filed: Jun. 4, 1990

[51] Int. Cl.⁶ .................................................. G09G 5/08
[52] U.S. Cl. .......................... 345/173; 345/119; 345/168
[58] Field of Search .................................... 340/706, 711, 340/712, 721, 723; 341/26, 29; 358/22; 345/113, 173, 114, 156, 115, 116, 119, 120, 123, 124, 125, 168; 395/155, 157; 348/578, 584

[56] References Cited

U.S. PATENT DOCUMENTS

| | | |
|---|---|---|
| 3,278,676 | 10/1966 | Becker ........................................ 358/22 |
| 4,185,282 | 1/1980 | Pick . |
| 4,190,833 | 2/1980 | Beyting et al. ........................... 340/712 |
| 4,202,041 | 5/1980 | Kaplow et al. . |
| 4,224,615 | 9/1980 | Penz . |
| 4,238,792 | 12/1980 | Cohen et al. ............................. 340/712 |
| 4,291,198 | 9/1981 | Anderson et al. . |
| 4,332,464 | 6/1982 | Bartulis et al. . |
| 4,333,097 | 6/1982 | Buric et al. ............................... 340/721 |
| 4,360,345 | 11/1982 | Hon . |
| 4,431,870 | 2/1984 | May et al. . |
| 4,449,186 | 5/1984 | Kelly et al. . |
| 4,451,895 | 5/1984 | Sliwkowski . |
| 4,509,043 | 4/1985 | Mossaides ................................ 340/721 |
| 4,509,526 | 4/1985 | Barnes et al. . |
| 4,545,023 | 10/1985 | Mizzi . |
| 4,547,851 | 10/1985 | Kurland . |
| 4,553,222 | 11/1985 | Kurland et al. . |
| 4,555,699 | 11/1985 | Citron et al. . |
| 4,586,035 | 4/1986 | Baker et al. .............................. 340/712 |
| 4,622,437 | 11/1986 | Bloom et al. . |
| 4,649,499 | 3/1987 | Sutton et al. . |
| 4,653,086 | 3/1987 | Laube . |
| 4,659,876 | 4/1987 | Sullivan et al. . |
| 4,667,299 | 5/1987 | Dunn . |
| 4,710,758 | 12/1987 | Mussler et al. .......................... 340/712 |
| 4,725,694 | 2/1988 | Auer et al. ............................... 340/712 |
| 4,775,935 | 10/1988 | Yourick . |
| 4,782,521 | 11/1988 | Bartlett et al. . |
| 4,827,253 | 5/1989 | Maltz ....................................... 340/703 |
| 4,887,082 | 12/1989 | Yamada ..................................... 341/26 |
| 5,017,143 | 5/1991 | Backus et al. ............................. 358/22 |

FOREIGN PATENT DOCUMENTS

| | | | |
|---|---|---|---|
| 0020561 | 2/1980 | Japan | ................................... 340/712 |
| 0031032 | 2/1982 | Japan | ................................... 340/712 |
| 0019836 | 2/1982 | Japan | ................................... 340/712 |
| 0158430 | 9/1984 | Japan | ................................... 340/712 |
| 0160225 | 9/1984 | Japan | ................................... 340/712 |
| 0151735 | 8/1985 | Japan | ................................... 340/712 |

OTHER PUBLICATIONS

T. F. Cummings; "Variable keyboard for Terminal Displays"; IBM Technical Disclosure Bulletin; vol. 16 No. 2 Jul./1973 pp. 575–576.

(List continued on next page.)

Primary Examiner—Richard Hjerpe
Assistant Examiner—M. Fatahiya
Attorney, Agent, or Firm—Cesari and McKenna

[57] ABSTRACT

A phantom keyboard is formed on a touch sensitive display as an input tool for a computer. The keyboard is superimposed on, though does not occlude from view, an image of an output of an application being run on the computer. In a another aspect of the invention, the simulated keyboard is displayed in a different fashion, in a window occupying, e.g., the bottom of the display rastor, while the application's output appears in a window occupying, e.g., the top of the display rastor. Since this arrangement provides only a fraction of the full rastor for displaying the output from the application program, a special scroll feature is provided. This feature permits the user to scroll through the full screen page of text, but without the text of any other screen pages appearing on the display. In yet another aspect of the invention, the key "auto-repeat delay" and "auto repeat rate" of the simulated keyboard are user adjustable, again preferably by an adjust appearing on the touch-sensitive display.

10 Claims, 9 Drawing Sheets

OTHER PUBLICATIONS

J. E. Young; "Universal Keyboard"; vol. 18 No. 1, Jun./1975; IBM Technical Disclosure Bulletin; pp. 263–264.

Computerworld article entitled "Standing Up For The Touch Screen," Jul. 23, 1984, pp. ID/1–ID4.

Electronic Design article entitled "Software Package Lets PC Control Instruments With A Touch," Oct. 31, 1984, pp. 180–194.

Educational Technology article entitled "A General Issue Examining Aspects of Educational Technology," vol. XXIV, No. 8, Aug., 1984, pp. 27–30.

Control Engineering article entitled "Control Panels: From Pushbuttons to Keyboards to Touchscreens," W. Raymond Flynn, Jun., 1984, pp. 79–81.

Byte article entitled "The HP 150 Computer," Mark Haas, Nov., 1984, pp. 262–275.

IEEE Communications Magazine article entitled "An Interactive Touch Phone For Office Automation," vol. 23, NO. 2, Feb., 1985, pp. 21–26.

Science, Systems & Services for Communications, "An Interactive Touch Phone For Future Offices," To Russell Hsing et al., pp. 272–275.

Electronics Review, "System For Terminals Created Keyboards Anyone Can Use," Jun. 5, 1980, pp. 39–40.

Cybernetics and Systems Research, "A Frame–Based Real-Time Graphic Interaction System," Horn, et al., 1984. pp. 825–830.

Product Bulletin entitled "Fluke 1020 Series Touch Control Screen," John Fluke Mfg. Co., 1986.

METHOD AND APPARATUS FOR DISPLAYING SIMULATED KEYBOARDS ON TOUCH-SENSITIVE DISPLAYS

CROSS-REFERENCES TO RELATED PATENT APPLICATIONS

This invention is related to those disclosed in the co-pending, commonly-assigned U.S. patent application Ser. No. 271,237, filed on Nov. 14, 1988, and entitled PORTABLE COMPUTER WITH TOUCH SCREEN AND COMPUTER SYSTEM EMPLOYING SAME (Attorney Docket No. 17051-1), and U.S. patent application Ser. No. 07/421,242 filed on Oct. 13, 1989, and entitled METHOD AND APPARATUS FOR DISPLAYING SIMULATED KEYBOARDS ON TOUCH-SENSITIVE DISPLAYS (Attorney Docket No. 17051-5), the disclosures of which being incorporated herein by reference.

FIELD OF THE INVENTION

This invention relates to computer systems having touch-sensitive input/output ("I/O") devices which can display and permit users to interact with simulated keyboards.

BACKGROUND OF THE INVENTION

Heretofore, personal computers and computer terminals have been suggested which use touch-sensitive displays as inter-active user-interfaces for both input and output of information (e.g., text and graphics). A touch sensitive display of this type generally has a conventional display screen provided with a transparent, generally flat touch-sensitive screen as a frontplate. Typically, the touch sensitive display is used in conjunction with application programs specifically designed to take advantage of this type of I/O device. In use, some such application programs can cause the display screens to display simulated, conventional-typewriter keyboards. The simulated keyboard is then available for entering data and commands for use or execution in the application program that generated the keyboard, but not in other application programs. In other words, the simulated keyboards are dedicated for use only in the specific applications in which they have been programmed.

In known simulated keyboards of this type, each key of the simulated keyboard is represented by a discretely-defined area bounded by a frame. In each key frame there appears an indicium of an alpha-numeric character, or a character representing punctuation, other symbol, or function. The simulated keyboard is visible through the touch-sensitive-screen overlaying the display.

For typing on the simulated keyboard, the user touches the touch-sensitive-screen on the displayed keys in the same fashion that a typist uses a conventional typewriter. The "touches" on the display cause the generation of coded electrical signals corresponding to the locations that are touched, and thereby representing the displayed characters (e.g., capital or lower case letters depending on whether the displayed shift key is touched) or functions selected by the user. The coded electrical signals then are processed by the computer in the same manner that it would process the electrical signals generated by a conventional keyboard input device.

Unfortunately, using the touch-sensitive display as a combination I/O device presents certain complications. For instance, when the simulated keyboard is "called up" and displayed on the screen, it may very well occupy the entire rastor or a substantial portion thereof. In order to accommodate such a simulated keyboard, either the normal output screen of that program must be removed from view in its entirety, or the window in which the simulated keyboard appears must be an overlay which replaces and, thereby, removes from view, a substantial portion of the program's normal output screen.

Clearly, this would not be suitable for running standard, commercially-available software packages such as data processing, spread sheets, or data-base management programs, even if such simulated keyboards were made available within these programs. If the simulated keyboard were positioned in the same place on the screen whenever it were displayed in such programs, the simulated keyboard, as often as not, would replace or cover the "active portion" of the software output screen. The active portion is the area of the screen into which the information being typed is to be entered. It is easy to understand that, if the user must enter data in such programs without the active portion of the software output screen being visible, data-entry accuracy and/or efficiency would suffer, to say the least.

Accordingly, simply incorporating a touch-sensitive simulated keyboard in such programs would result in geometric conflicts between the normal software output screen and the simulated keyboard window.

The above-referenced patent application, Ser. No. 421,242 discloses various novel solutions to the geometric conflicts problem, while providing a touch-sensitive simulated keyboard (e.g., a typewriter-type keyboard) which is a general-purpose, rather than application-dedicated, I/O device or tool. The simulated keyboard program remains resident in computer memory, and is controlled at the operating system level rather than the software application level. In other words, the control of the simulated keyboard image, including its position within the display raster, is the responsibility of the basic input/output services of the computer. In this way, the touch-sensitive keyboard is resident within the computer as a system utility and is independent of any specific application run on the computer. Therefore, it can be used at the discretion of the computer user at any time in conjunction with any application program run on the computer.

While the various teachings of that patent application substantially advance the art, further solutions to the geometric-conflict problem, as well as other drawbacks of using the disclosed input/output device are desired to enhance, e.g., its ease of use, versatility and breathe of capabilities.

In addition to the geometric conflict problem, another drawback of using a simulated keyboard displayed on a touch-sensitive display is its effect on typing efficiency. The generally flat display "feels" different from conventional keyboards, and this can result in (or amplify) keystroke variations that cause, for example, a key to be pressed longer than usual. As with conventional electronic keyboards, prolonged pressing of a key generally will cause the character corresponding to it to be repeated. (For example, keeping the "B" key depressed will cause multiple "B's" to appear on the display.) It would be desirable to provide a simple and effective way for a user to avoid such typographical errors from occurring.

SUMMARY OF THE INVENTION

The invention resides in a simulated keyboard being displayed on a touch-sensitive display of a computer as a "phantom" or "ghost" image super-imposed on, though not occluding from view, the displayed output screen of an application being run. Both images preferably appear to the user as being continuously displayed (i.e., they do not "flicker" or fade in and out). The phantom keyboard gets its name since its image is not as bold as that of the output.

This novel effect is produced by generating the keyboard and output images in alternation and controlling the "generation" time and/or "off" time of each. Using a liquid crystal display ("LCD"), it has been found that painting the keyboard image on the display for about 60 milliseconds, and then painting the output image for 120 milliseconds before again painting the keyboard image, produces the desired visual effect.

Thus, a desirable display time ratio (i.e., the ratio of the generation time of the keyboard image to the generation time of the output image) is on the order of one half. Preferably, the ratio is adjustable by a user-actuated control, e.g., an adjustment device on the touch-sensitive display. The adjustment device preferably itself is a touch-sensitive "phantom" key, that is, a key whose frame appears in phantom, just like the phantom keyboard.

LCD's are believed particularly advantageous in producing the phantom keyboard since light emitted from the liquid crystals tends to "linger", while the on/off radiation response of, e.g., cathode ray tubes is quicker. That plus the short duration between the times that the phantom keyboard is painted, fools the "eye" of the user into believing the keyboard is continuously (or, at least, substantially continuously) being displayed.

The phantom keyboard thus produced is of particular value since it preferably operates using a memory resident routine which is independent of the application program being run. For example, when used in conjunction with spread sheet programs, entire output screens (i.e., spread sheets) can be viewed while entering or editing data into cells of the spread sheets using the phantom keyboard. No external, conventional keyboard is required.

It should be apparent that, in the above arrangement, the application output (in this case, a spread sheet) can be displayed using the full raster of the display screen. This can be thought of as a full "page" or "screen page" of information being displayed at once.

In a another aspect of the invention, the simulated keyboard is displayed in a different fashion, in a window occupying, e.g., the bottom of the display raster, while the application program's output appears in a window occupying, e.g., the top of the display raster. Since this arrangement provides only a fraction of the full raster normally available to display the output from the application program, a special scroll feature is provided. This feature permits the user to scroll through the full screen page on a line by line basis, just like one could scan a single page in a book.

Thus, for example, where the full screen page contains 25 lines, and only 14 lines are available in the first window for displaying the output screen (with the simulated keyboard being displayed concurrently in the remaining lines of the display which form the second window), the scroll permits the user to view the 11 lines of the full screen page which do not fit in the first window. In other words, with continued scrolling, this feature permits viewing of all the 25 lines constituting the full screen page. This scroll does not permit viewing, however, of lines of other screen pages, i.e., viewing of other than those lines of the screen page of which the 14 displayed lines would be a part if the full raster were used to display the output.

Preferably, the scrolling is instigated and controlled by a user touching either of two "phantom" keys, a "scroll-up" key or a "scroll-down" key.

In yet another aspect of the invention, the key "auto-repeat delay" and "auto repeat rate" of the simulated keyboard are user adjustable, again preferably by an adjust appearing on the touch-sensitive display. The auto-repeat delay is a measure of the length of time a key can continue to be touched after a first electrical signal is generated and before it generates a second electrical signal corresponding to the character or function represented by that key. Put another way, the auto-repeat delay for a character key, for example, can be thought of as the length of time between the display of the character corresponding to that key, and a repetition on the display of that character. On the other hand, the auto-repeat rate is a measure of the rate at which a successive repetition (third, fourth, etc.) of that character will appear on the screen.

Preferably, the adjust used to regulate the auto-repeat delay and rate constitutes two touch-sensitive, calibrated line scales, one for each. These scales permit a user to change the associated rates with ease. The user simply touches any point along the scale above or below a set point indicating the previously set rate. The computer "reads" the touched point, and modifies the previous rate accordingly. With this arrangement, a user can customize the "feel" of keystrokes on the simulated keyboard, with a view toward improving typing efficiency.

BRIEF DESCRIPTION OF THE DRAWINGS

For a fuller understanding of the nature and objects of the invention, reference should be had to the following detailed description taken in connection with the accompanying drawings, in which:

FIG. 1 is a block diagram of a computer system in accordance with the invention;

FIGS. 8 through 14 depict, in flow chart form, an algorithm for displaying and using a touch-sensitive simulated keyboard on the computer system of FIG. 1.

DETAILED DESCRIPTION OF PREFERRED EMBODIMENT

FIG. 1 shows a computer system 10 in accordance with a preferred practice of the invention. At the working heart of the system 10 is a central processing unit ("CPU") 12 which communicates with a memory 13, a clock 14, and peripherals via a bus 15. These peripherals include an interactive user interface 16, touch screen controller 18 and display controller 20.

The user interface 16 has a transparent touch-sensitive input screen or panel (the "touch screen") 24 and a conventional display unit 26. The display unit 26 has an output screen 28. Preferably, the touch screen 24, overlays, i.e., mounts as a frontplate directly over, the output screen 28. Shown on the output screen 28 is a simulated keyboard, generally designated at K.

More specifically, the touch screen 24 in a preferred embodiment is a glass plate coated on its touch-sensitive side 24a (i.e., the side facing away from the output screen 28) with a resistive material, and then covered on that side with a Mylar contact sheet (not separately shown). The contact sheet is maintained at a small, substantially-uniform distance from the touch-sensitive side of the glass plate.

Pressure exerted on the contact sheet by a finger, stylus or other object, (herein called a "touch") causes the contact sheet to make electrical contact with the resistive coating.

In use, the touch screen controller 18 impresses a voltage gradient across the resistive coating alternately in the "x" (i.e., horizontal) and "y" (i.e., vertical) directions. By establishing a voltage divider circuit, the touch produces voltage signals detectable by the touch screen controller 18 which are representative of the average Cartesian coordinates in the x- and y- directions of the touched area of the screen.

These voltage signals are converted to digital signals by the touch screen controller 18. These digital signals represent each of, for instance, 256, discrete positions on the touch screen 24 in each direction. To accomplish this, for example, two 8-bit bytes are used to represent the x-coordinate, and two 8-bit bytes are used to represent the y-coordinate. Thus, the digital signal representing each such touch constitutes a coordinate set having the following format:

| 1 | 2 | 3 | 4 | 5 |
|---|---|---|---|---|
| $x_1$ | $x_2$ | , | $y_1$ | $y_2$ | where "$x_1$" and "$x_2$" are the two bytes or characters representing the x-coordinate, and "$y_1$" and "$y_2$" are the two bytes or characters representing the y-coordinate. Each such five-character coordinate set completely defines a touch.

The five-character coordinate sets are transmitted by the touch screen controller 18 over the communication bus 15 to the CPU 12 for processing. Suitable touch screens and touch screen controllers are commercially-available, e.g., from ELOGRAPHICS of Oak Ridge, Tenn., U.S.A.

The CPU 12 receives the coordinate sets from the touchscreen controller 18, and stores the sets as data structures 14a each sequentially in an x,y buffer 13a, which is, for example, a six-byte section of the memory 13. The CPU 12 includes a cursor control 35 for tracking and storing the location of the cursor, and controlling its position on the display. Both the CPU 12 and memory 13 can be implemented using conventional, commercially available hardware.

The display 26 is preferably a liquid crystal display which is back lit. A suitable size for the rastor of the display 26 is, for example, 640×400 (i.e., 400 rows of pixels, with 640 pixels in each row), although other rastor sizes providing a different number of rows or a different number of pixels in each row also can be used.

The display screen 28 has preferably 80×25 character boxes. That is, it has 80 columns by 25 rows of character boxes, or, in other words, it can display 25 lines of characters, with 80 characters in a line.

The computer system 10 can also include other components and features conventionally found in personal computers or computer terminals. Computer 10 is shown and described only to the extent necessary to convey an enabling understanding of the best mode of implementing the invention, as will be apparent to those skilled in the art.

Figure 2:
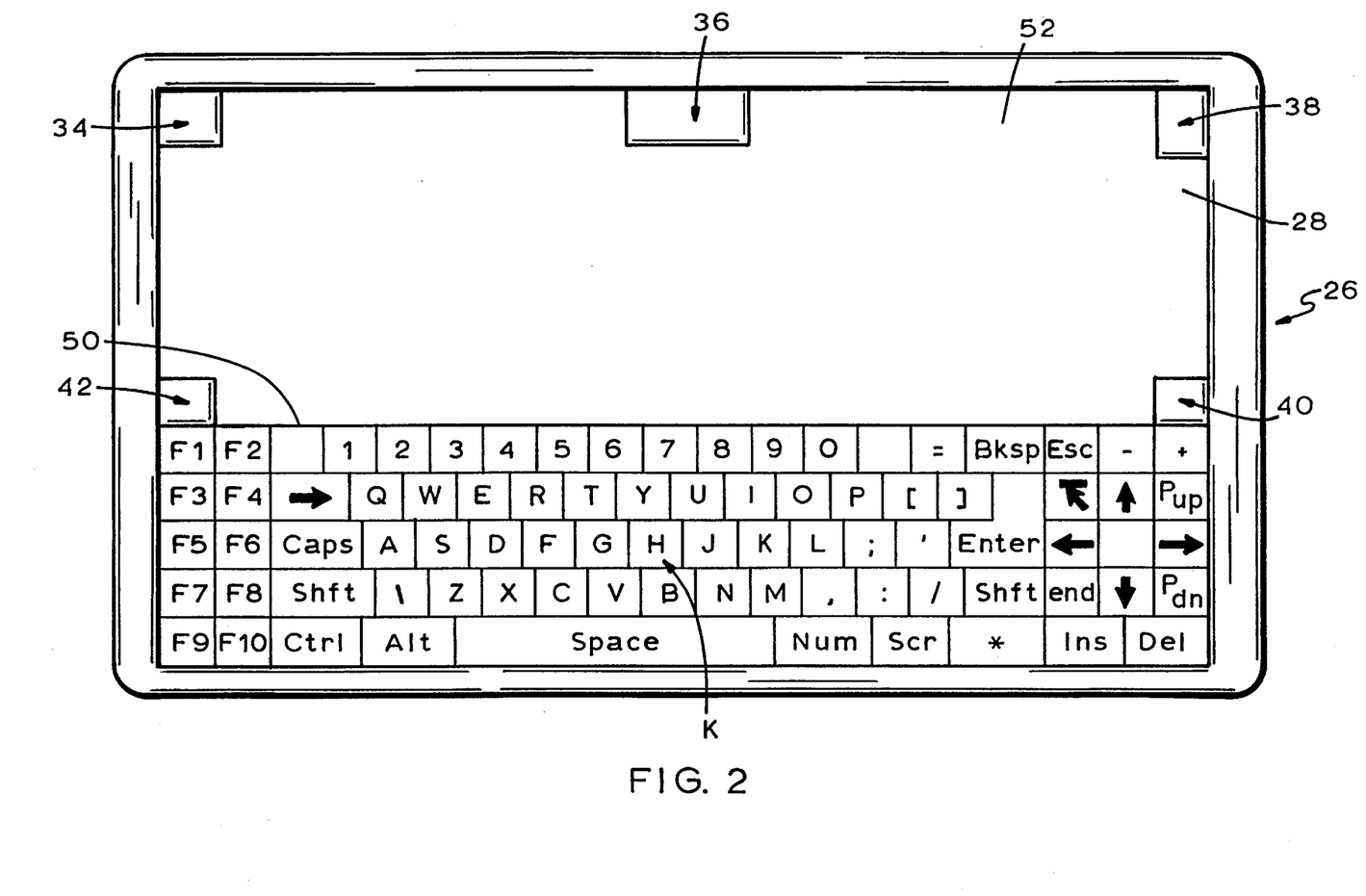
FIGS. 2 through 7 are front views of the touch sensitive display of FIG. 1, showing various illustrative application output screens, simulated keyboard screens, and set-up screens.

FIG. 2 depicts a display layout for the touch-sensitive display 26 showing a simulated keyboard K in generally a rectangular window 50 occupying the bottom 11 lines of the screen 28, and five control "buttons" (i.e., keys) 34–42 located in the corners of a generally rectangular window 52 occupying the 14-line portion of the screen 28 above the simulated keyboard K, and the upper middle of the screen 28.

The simulated keyboard K can be used to enter data or commands for running, for example, commercially-available standard software packages such as data processing, spread sheet, and data-base management programs, which have been designed for use with conventional keyboard devices. It can be appreciated that the simulated keyboard K is a general-purpose input device, useful in conjunction with a broad range of computer application programs.

The control buttons 34–42 include: a SIMULATED KEYBOARD ON/OFF button 34, which appears in the upper left-hand corner of the screen 28; a PHANTOM KEYBOARD ON toggle button 36, which appears in the upper middle of the screen 28; a WINDOW SCROLL UP button 38, which appears in the upper left corner of the screen; a WINDOW SCROLL DOWN button 40, which appears in the middle of the right side of the screen 28; and a FULL-SCREEN/KEYBOARD toggle button 42, which appears in the middle of the left side of the screen 28, as viewed in those drawings.

The function of the control buttons 34–42 will be understood from the description of the operation of the simulated keyboard given shortly. For now it is sufficient to give a brief, further explanation of each.

When the SIMULATED KEYBOARD ON/OFF button 34 is pressed (i.e., touched), the simulated keyboard is activated or deactivated, depending on its condition immediately before the touch. When activated, the simulated keyboard K can be used to enter or modify data in the output screen of an application program. This is illustrated in FIG. 3.

Figure 3:
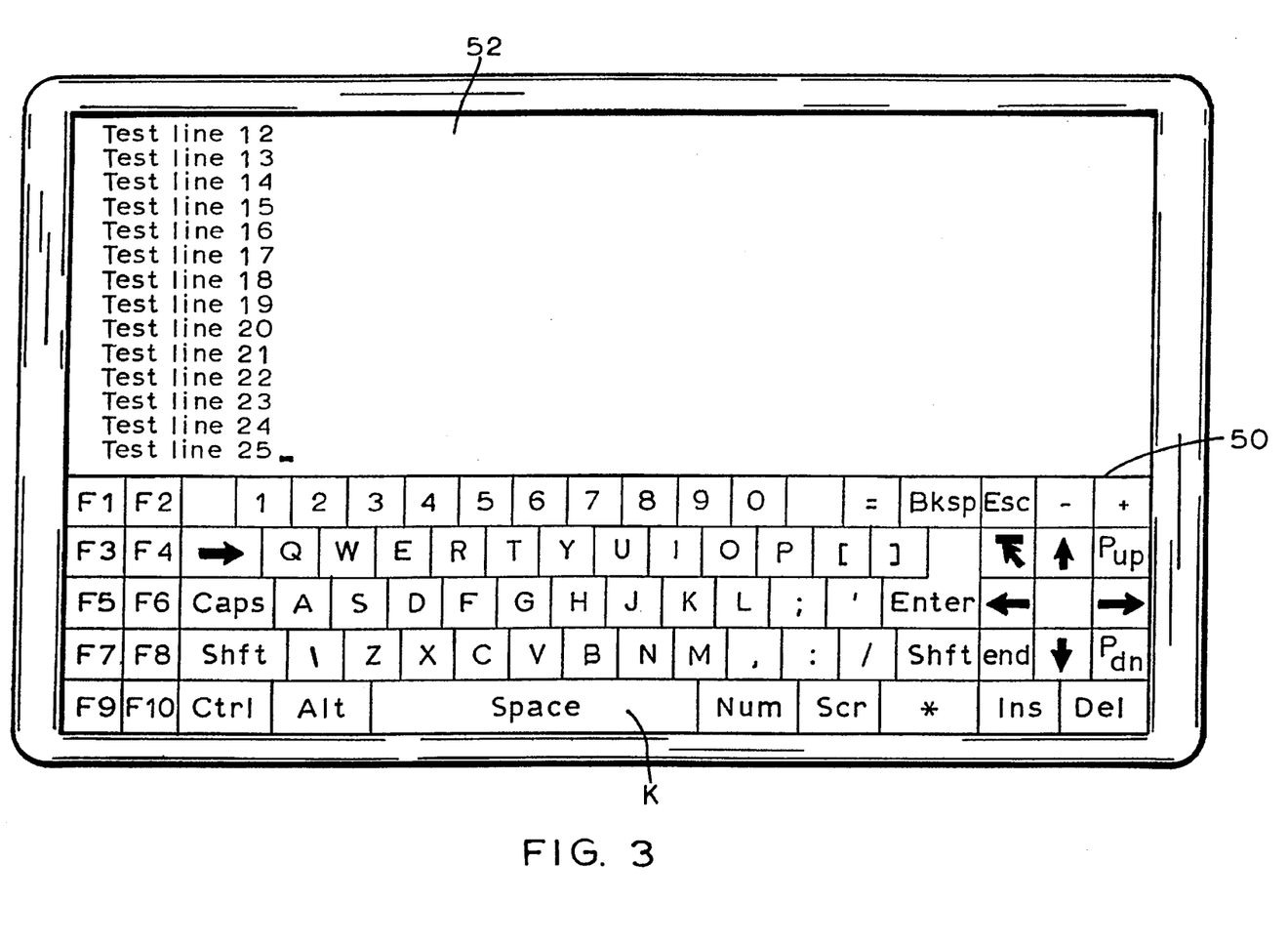

As shown in FIG. 3, an output screen appears in window 52 occupying the top portion of screen 28. For purposes of illustration, the output screen appears as 14 Testlines numbered 12 through 25. (These numbers should not be confused with reference numbers.) The cursor 52 is located in next to the text in Testline 25. Of course, the output can be most anything, ranging from wordprocessing text to a spread sheet.

Note that the control buttons 34–42 in FIG. 3 are no longer visible. In one embodiment of the invention, the control buttons indeed are transparent, and a user must simply remember their locations. In another version of the invention, the control buttons appear in "phantom," just like the phantom keyboard discussed herein.

Figure 4:
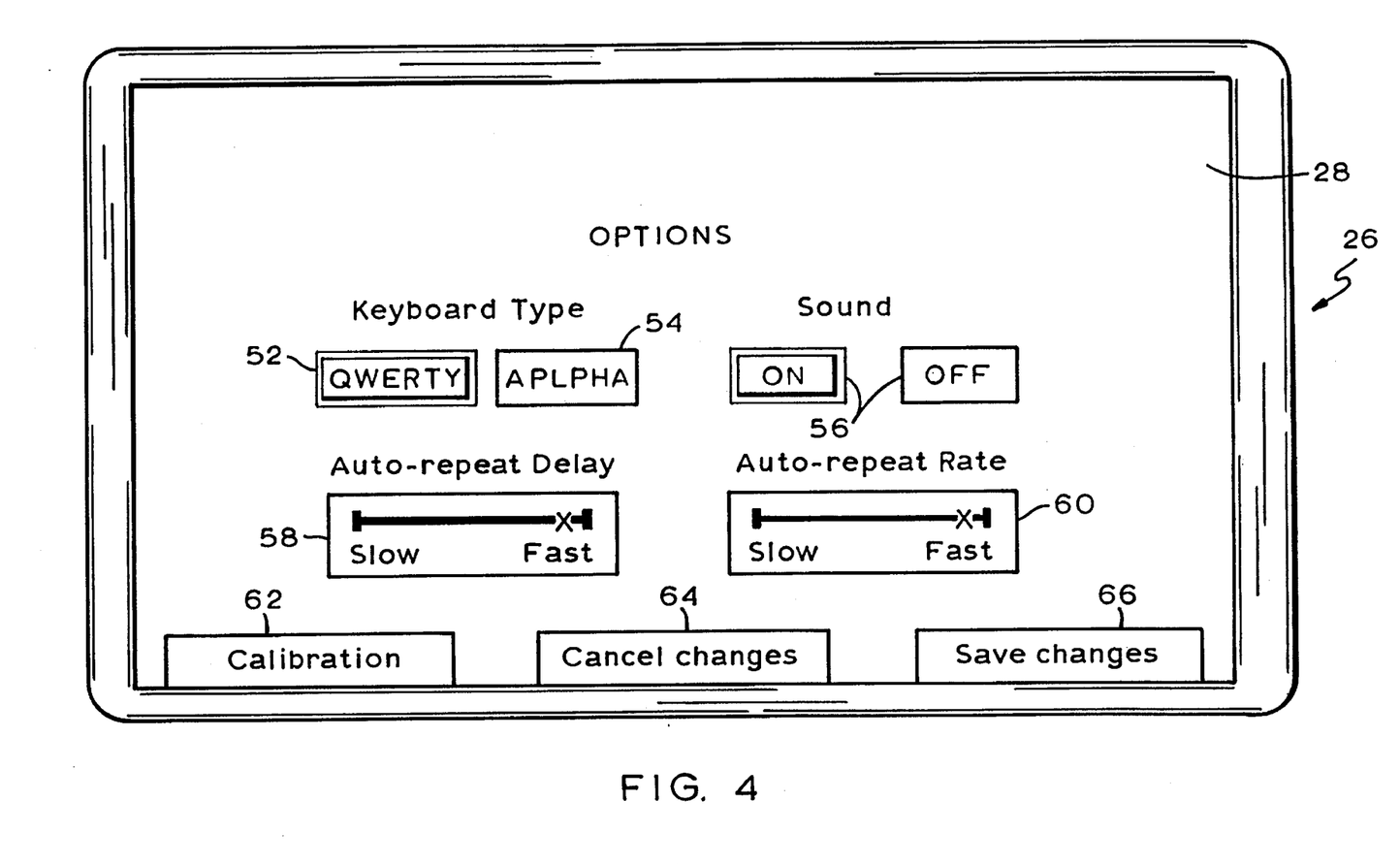

If the SIMULATED KEYBOARD ON/OFF button 34 is "held down" or touched for several seconds, an OPTIONS or set-up screen appears, as shown in FIG. 4.

The OPTIONS screen is illustrated as having a plurality of touch sensitive buttons 52–66 arranged by function. The "keyboard type" buttons 52, 54 control whether the keyboard is alphabetically arranged (i.e., alpha) or arranged as are conventional typewriter's keys (i.e., QWERTY), respectively. One or the other of the buttons 52, 54 can be pressed to indicate a users choice. The "sound" control 56 consists of on/off buttons, and is used to enable or disable, for example, the "click" that is customarily used as an audio indication of the pressing of a keyboard keys. Preferably, the computer 10 has a sound system 29 (FIG. 1) to produce such sounds.

In accordance with the invention, the OPTIONS screen of FIG. 4 also has devices 58, 60 for setting the auto-repeat delay and the auto-repeat rate, respectively. These control the generation time parameters for the simulated keyboard's keys. As will be appreciated, when a keyboard key is pressed, almost immediately an electrical signal is produced to and sent to the CPU 12 (FIG. 1) to indicate, for example, that a particular character is to be displayed. The auto-repeat delay device 58 controls the length of time a key can be pressed before that particular character is to be repeated for a second time on the display. The auto-repeat rate device 60 controls the time rate of the generation of successive electrical signals by the keyboard keys when pressed continuously. By enabling a user to customize both these parameters, use of the simulated keyboard K is facilitated.

The OPTIONS screen has also a calibration key 62 to check the calibration or recalibrate the touch screen 21 to assure that the CPU 12 (FIG. 1) is correctly calculating the position of each touch. To calibrate the touch screen 21, one or more corners are touched, and, since the locations of these are fixed, the computer 10 can thereby calculate the appropriate cross-reference between the electrical signal produced by the touch, and its position on the touch screen 21.

The final two buttons 64, 66 of the OPTIONS screen determine whether the information entered via the other buttons 52–62 is to be canceled or saved, respectively.

Figure 5:
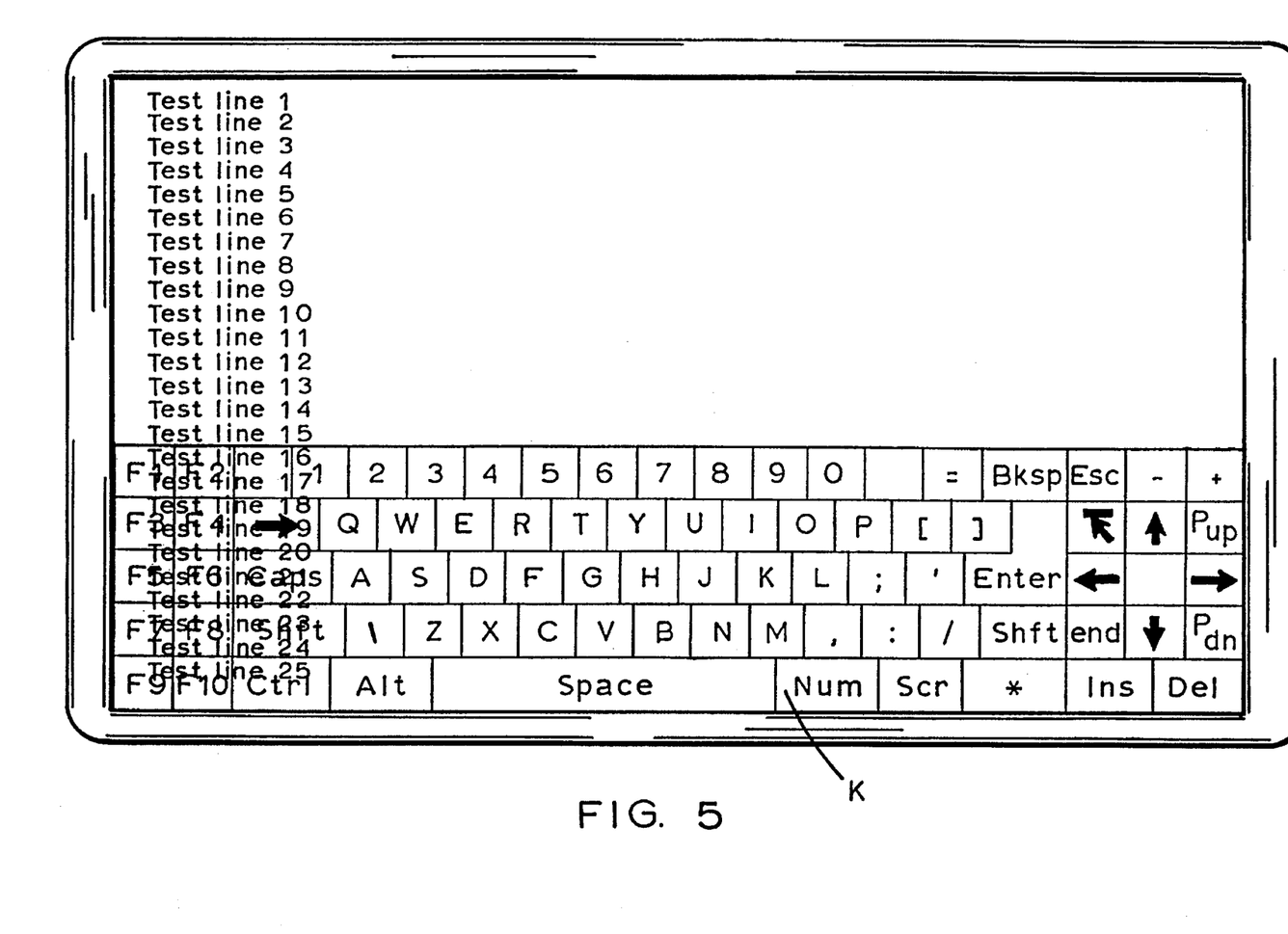

Returning to FIG. 2, when the PHANTOM KEYBOARD button 36 is pressed, a "phantom" or "semi-visible" simulated keyboard K1 will appear as illustrated in FIG. 5 at low intensity in, for example, the window 50 in the bottom of the screen, while the output of the application program being run, appears throughout the full screen.

Figure 6:
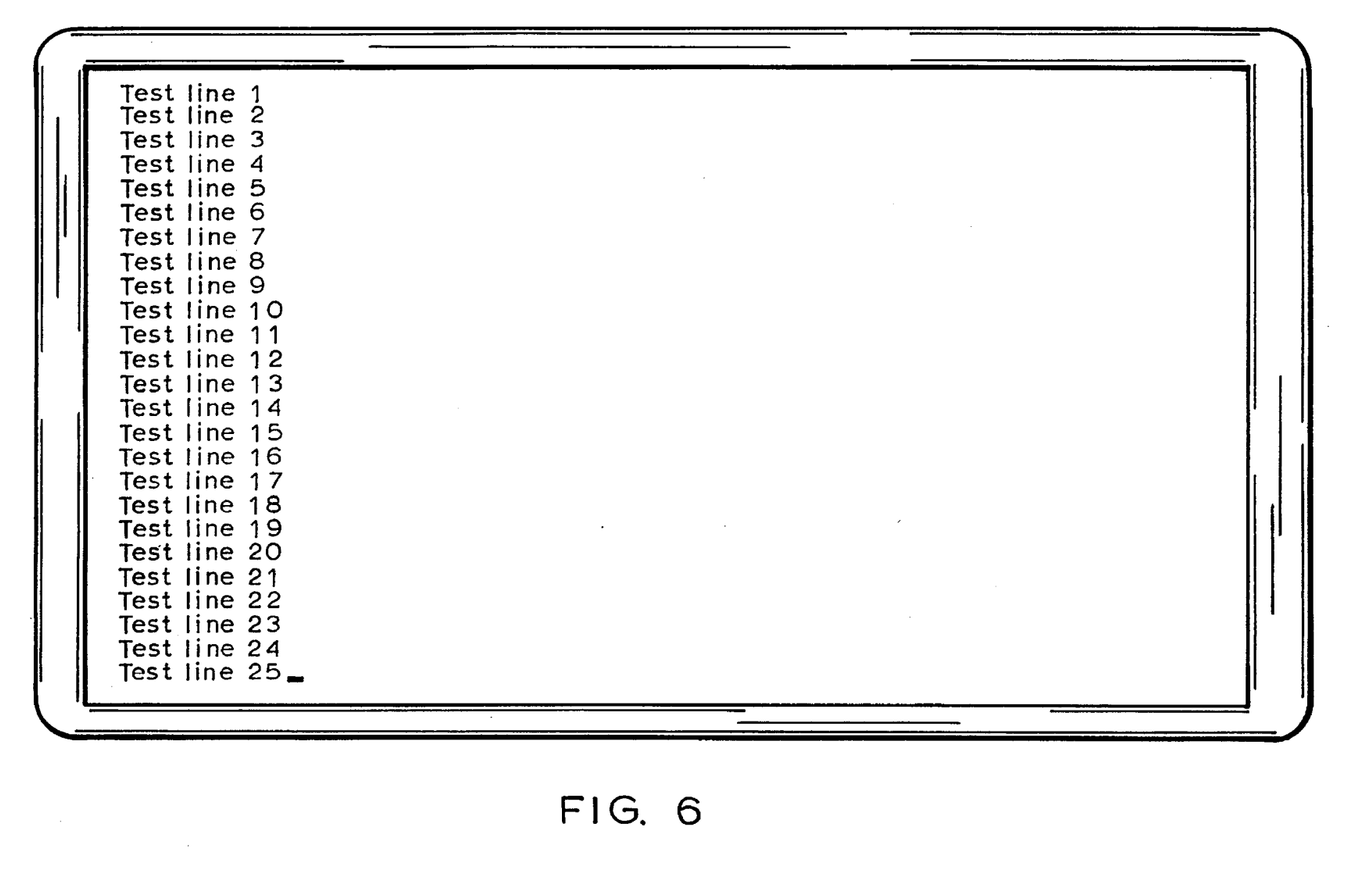

To better appreciate the phantom keyboard K1, consider FIG. 6. There, the screen 28 displays an application output, this time consisting of Testlines 1 through 25, across its full length and breadth. Displaying the simulated keyboard K as shown in FIG. 3 would obstruct the bottom half or so of the output, e.g., from Testline 15 through Testline 25. With renewed reference to FIG. 3, it is apparent that the phantom keyboard K1 eliminates this problem by displaying both the entire output screen and the simulated keyboard superimposed, one over the other. By controlling the relative intensities, a user can readily distinguish, e.g., the key frames and identifying indicia from the text of the output screen. It fact, it has been found that the relative intensities can be factory set, and yet provide for readable screens for most users. On the other hand, a user adjust can be provided, preferably a touch-sensitive scale on the OPTION screen.

For some users or applications, however, it is preferred to view only a portion of the output, and the simulated keyboard of FIG. 2 is the tool of choice. To facilitate typing with that simulated keyboard display, a novel technique is provided to view the full output screen in the approximate-half-screen window 52. SCROLL-UP and SCROLL-DOWN keys 38, 40 are provided for this purpose.

In accordance with the invention, each output screen can be scrolled through the window 52 using these keys 38, 40, and, all the while, the cursor will remain on the screen. Importantly, when so scrolling, no other output screen is displayed. For example, where the output screen is that shown in FIG. 6, and the split-screen display of the simulated keyboard results in the display of FIG. 3, the output text can be scrolled down so that Testline 11, then Testline 10, etc., appear on the screen. However, the output screen will not scroll beyond Testline 25 or, for that matter, Testline 1, since those lines mark the boundary lines of the relevant screen page.

Figure 7:
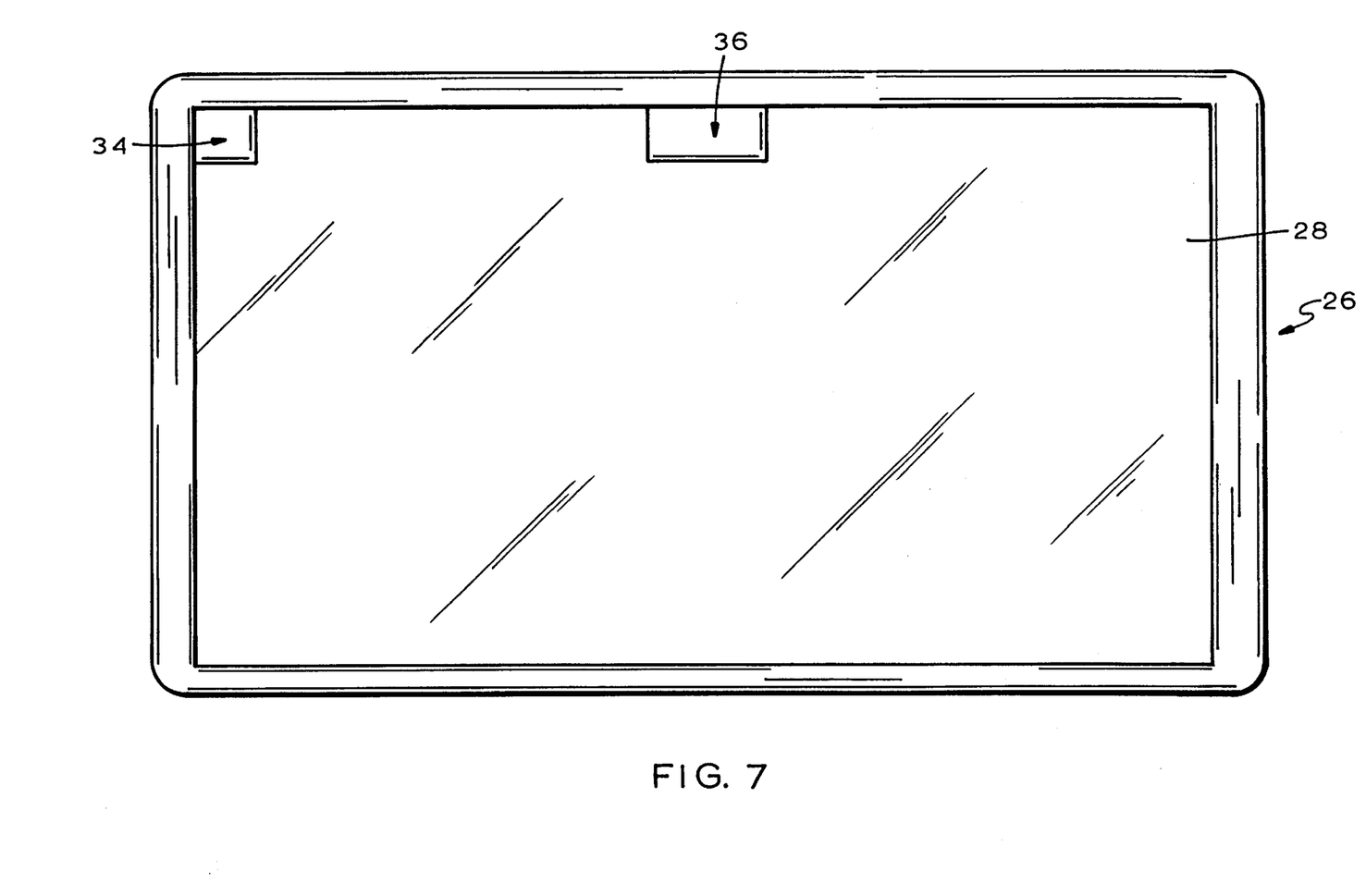

Returning to FIG. 2, the FULL SCREEN/KEYBOARD toggle button 42 permits a user to toggle between the split screen of FIG. 2 in which only approximately half the screen is available for displaying the output, and the full screen of FIG. 7. (Note that, since window 52 of FIG. 2 has no output text, the screen 28 of FIG. 7 likewise is devoid of text.)

Simulated Keyboard Algorithm

The simulated keyboard K is displayed and used pursuant to a computer program stored in, for example, memory 13 (FIG. 1). An enabling understanding of that program will now be provided by describing a suitable algorithm 100 therefor.

Figure 8:
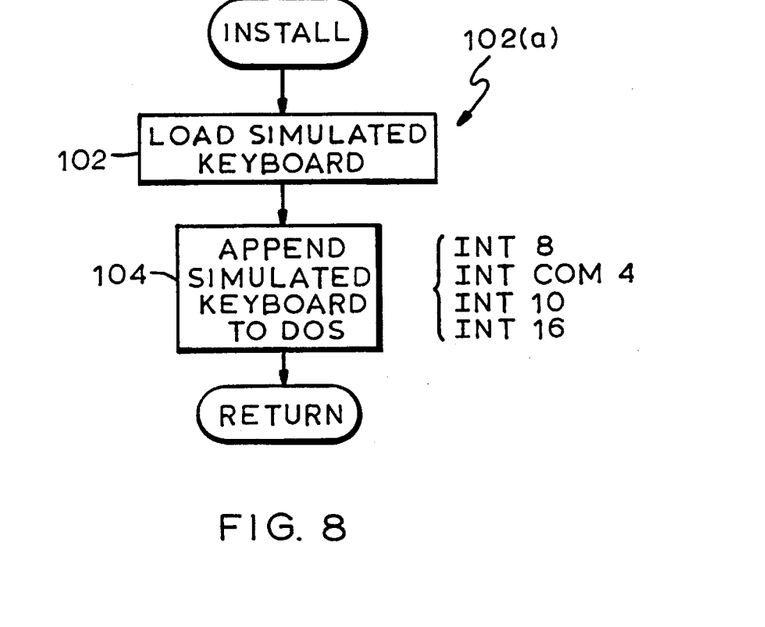

FIG. 8 depicts a routine 100*a* of algorithm 100 for installing the simulated keyboard program in memory 13. In block 102, the simulated keyboard program is loaded into memory 13 and its calibration checked. This step includes the entering of various routines 102*b*–102*e*, which are described hereinafter.

As shown in block 104, the simulated keyboard program is appended to the disc operating system. This integrates the simulated keyboard program with the operating system, and its various interrupts, including the timer interrupt INT-8, the communication interrupt INT-COM4, the video interrupt INT-10, the keyboard interrupt INT-16. Interrupts can be thought of as control signals that provide breaks in the normal flow of routines. The present invention preferably uses the interrupts already provided in the operating system, but for purposes special to the invention. The appending of the simulated keyboard program to the operating system entails the installation of various vectors. The end result of this process is that the keyboard can be rightly regarded as a "device driver" rather than an application program.

The timer interrupt INT-8, which, for purposes hereof, provides a clock signal for the phantom keyboard display, uses the hardware clock 14 (sometimes called the "tick clock") used typically by the disc operating system. The hardware clock 14 "ticks" by generating a clock interrupt at a rate of 18.2 times per second in known systems. Thus, each tick lasts about 55 milliseconds. For our purposes, this number will be rounded off to 60 milliseconds. An interrupt handler (not shown) for the clock 14 tracks the ticks by adding one to an appropriate clock count for each tick of the clock.

The communication interrupt INT-COM4 is used for recovering a set of coordinates of a touch on the touch screen. Each touch causes the interrupt INT-COM4 to be generated for interrupting CPU operations and for transferring an electric signal corresponding to the location of a touch (and of, for example, a character associated with the touch) to the CPU.

The video interrupt INT-10 is responsible for controlling the flow of the routine governing the refreshing of the display. Thus, this interrupt is used to break the normal flow of the operation of the video controller. Algorithm 100 preferably is synchronized with application programs which display outputs by using this interrupt. Otherwise, the present invention would have to generate an interrupt each time it changes the displayed keyboard (e.g., on scrolling the display). Multiplying the number of interrupts in this way beyond a certain threshold would unduly slow computer response time. With each video interrupt INT-10, if the simulated keyboard K has been enabled and is being displayed, algorithm 100 carries out the REFRESH DISPLAY routine described below.

The keyboard interrupt INT-16 arises each time a key is pressed. In accordance with the invention, the displayed keyboard is refreshed periodically in response to this interrupt.

Figure 9:
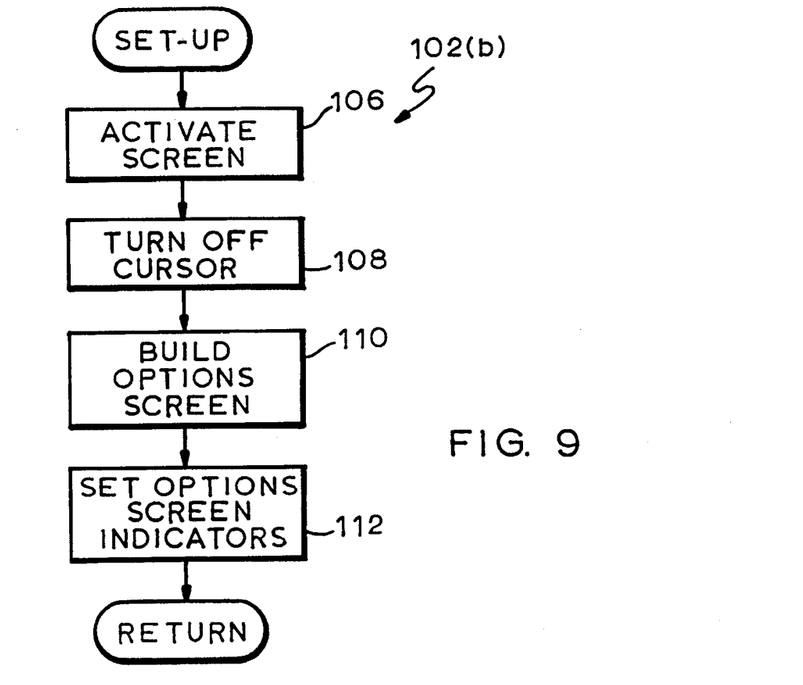

Turning now to other simulated keyboard routines, FIG. 9 shows SET-UP routine 102*b*. This routine is responsible for building the OPTION or SET-UP screen shown in FIG. 4. In this routine, in block 106, selective regions of the screen are activated, i.e. will produce electrical signals corresponding to, and processible to determine the location of, a touch thereon. Then, in block 108, the program disables the screen's cursor. In block 110, the SET-UP routine 100*b* then causes the display to build or paint the display shown in FIG. 4 and, in block 112, causes the screen to indicate the preset conditions of the various options available. For example, if sound has been selected then the ON key will be indicated by being bolder in intensity then the other key. Likewise, if a QWERTY type keyboard has been designated, then the corresponding QWERTY key will be illuminated. Likewise, a previous setting for auto-repeat delay and auto-repeat rate will be shown by an X along the appropriate slow/fast line.

Figure 10:
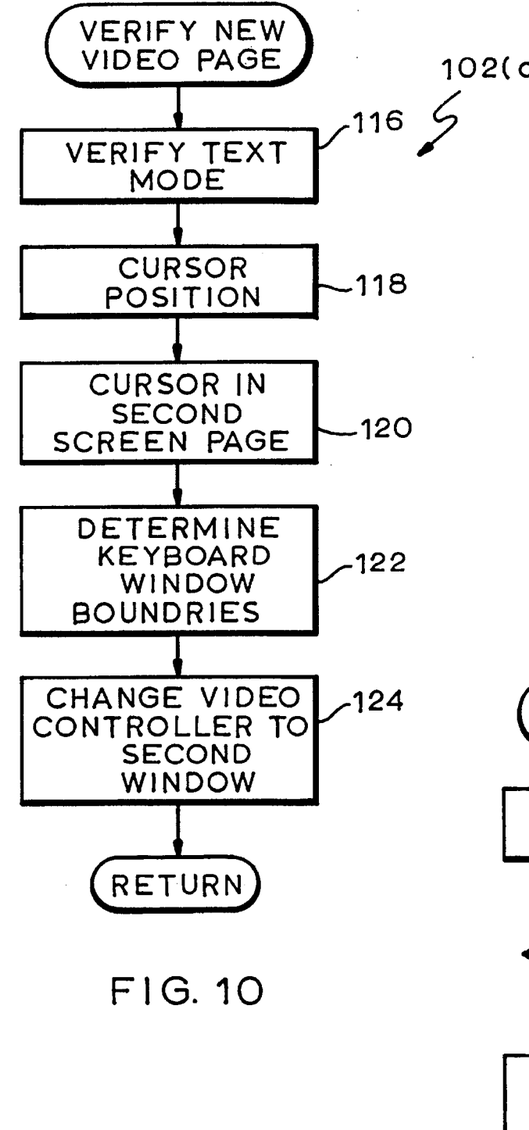

FIG. 10 depicts a procedure for controlling the video controller PAGE that is being displayed. In block 116, algorithm 100 assures that the display is in its text mode rather than its graphic mode.

As mentioned above, the invention preferably uses a color graphics controller or adapter ("CGA"). Typically, CGA's have a memory 20a. While known monochrome adapters each have just enough storage capacity in their memory to hold all the information that appears on the display screen at once, CGA's memory 20a is larger than is needed for a text screen image. The reason is that the graphics modes for which these adapters are designed requires more display memory than the text modes require. The present invention uses this extra memory to hold several independent screen-loads of information. These separate screen-loads are called "screen pages."

For example, for 80-column text, only a certain size memory is needed to hold the display screen information. A known type of CGA has enough memory for four separate screen pages when in the text rather than graphics mode. Thus, the CGA memory can be divided into four independent screen pages. Any one of these can be activated so that its information can appear on the display. While only one page appears on the screen at a time, the video controller has access to all the memory stored screens.

The separate screen pages are denoted as PAGE 0 through PAGE 3 (see FIG. 1). Most applications use PAGE 0 or PAGE 1; the present invention uses PAGE 2. The contents of PAGE 0 or PAGE 1, whichever the case may be, is mapped into PAGE 2. Then, the video controller displays PAGE 2 instead of the other page. This occurs transparently, unknown to both the user and the application program.

Of course, certain steps must be taken in order to operate using PAGE 2. Returning to the drawings, in block 118 the cursor position in PAGE 0 of the video controller is determined and the corresponding position in PAGE 2 of the video controller is calculated. In block 120, that cursor position in PAGE 2 is analyzed to verify that it falls within the 25 lines constituting the full-screen page. If it is not within the screen page, the algorithm 100 automatically scrolls up or down until the cursor is within the screen page being displayed. After this is done, the program computes the top and bottom rows for the fourteen line window which will contain the simulated keyboard. This determination of the boundaries of the simulated keyboard occurs whenever the algorithm 100 must scroll in order to properly position the cursor. It also takes place whenever the algorithm 100 switches between the display of the fourteen line screen page. Next, the algorithm 100 in block 124 changes the video controller from displaying page 0 to page 2, if it is not already doing so. If need be, algorithm 100 will recompute the cursor location so that it is properly positioned in page 2.

Figure 11:
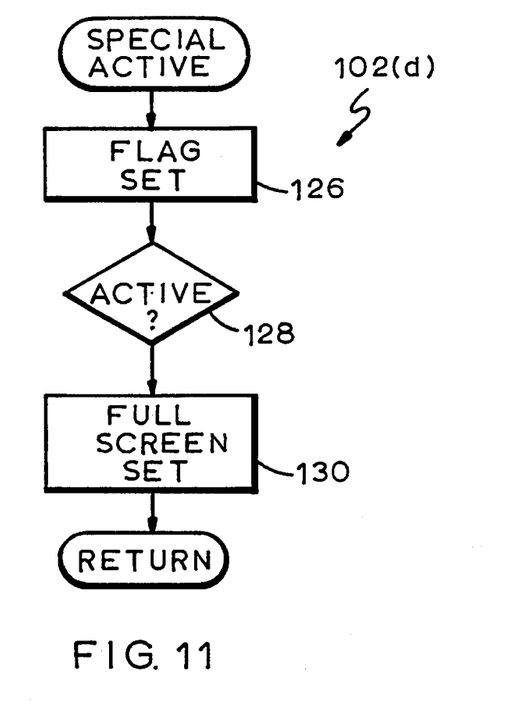

FIG. 11 shows a SPECIAL-ACTIVE routine 102d. Whenever the toggle full screen button is pressed, this program determines whether to display or remove the Keyboard. Whenever the Keyboard is to be displayed, it is always displayed in the bottom half of the screen. In block 126 certain flags or parameters are set, including: ALTERNATE FULL which is set to false. Then routine 102d determines whether or not the Keyboard is active, if it is, then another parameter FULL SCREEN is set to true in block 130. Then a routine refresh display 102(e) is called, which shall be described next and is depicted in FIG. 12. The refresh display routine controls the painting of the screen and particularly is utilized to establish the phantom keyboard.

In FIG. 8, the refresh display routine 102(e) initially tests the condition of various parameters in block 140. If the keyboard is not active or if the FULL SCREEN OR ALTERNATE FULL parameters are not set to true then a left-hand branch 142a of the routine 102e is followed, otherwise a right-hand branch is followed. (These parameters can be controlled using an appropriate routine to toggle their values, as will be apparent to those skilled in the art.) Proceeding down the left-hand branch, block 144 paints the output screen from the application program. This proceeds for two ticks of the computer clock 14, for example, which is approximately 120 milliseconds. Then the program returns. In the right-hand branch 142b a video controller screen routine, in block 146, is called and executed as described above. Then the refresh template routine, in block 148, is also called and executed. This program builds and displays the phantom simulated keyboard K1. The display time is preferably one tick of the computer clock 14, for example, which amounts to 60 milliseconds. After doing so the program returns.

The refresh template routine is shown in FIG. 9. In this routine first the algorithm 100 tests whether or not the simulated keyboard which herein is called the template is shown on the screen. If it is not then the algorithm 100 displays the keyboard.

An appreciation of the present invention can be had by considering the subject matter of the above-mentioned, related patent application entitled PORTABLE COMPUTER WITH TOUCH SCREEN AND COMPUTER SYSTEM EMPLOYING SAME. That patent application discloses a unique, compact, general-purpose lap-top computer, which uses either a conventional external keyboard or a built-in touch-sensitive display. For running standard software packages, such as those mentioned above, a simulated keyboard having a full complement of keys arranged in either the conventional QWERTY or an alphabet format can be displayed.

Employing the simulated keyboard for entering information and instructions using the disclosed computer often is more convenient then using an external keyboard. For example, it would be unwieldy to use an external keyboard when the disclosed computer is being used in an automobile or airplane. Furthermore, it would be awkward to use an external keyboard while the user is ambulatory. In addition, it makes sense to eliminate such peripherals in order to take full advantage of the compact design of the computer. Thus, the advantages of the present invention are evident.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A computer comprising:

A. a processor for executing an application program and generating an output in response to said executed application program, said processor further generating a simulated keyboard independent of said executed application program;

B. a touch-sensitive display coupled to said processor for generating an output image from said processor and a simulated keyboard image; and C. means coupled to said display for causing said display to generate and refresh, in alternation and repeatedly,
(i) said image of said output during a first period of time and at a first luminous radiation intensity level having a predetermined persistence, and
(ii) said image of said simulated keyboard during a second period of time and at a second luminous radiation intensity level having said predetermined persistence, said second period of time being shorter than said first period of time and said second intensity level being lower than said first intensity level, said second period of time divided by said first period of time defining a display time ratio;

whereby said predetermined persistence of said luminous radiation and said display time ratio causes said images to appear substantially continuously on said display to generate a "phantom" keyboard on the display.

2. The computer of claim 1 further comprising means for adjusting the display time ratio.

3. The computer in accordance with claim 2 wherein said first period of time is approximately 60 milliseconds.

4. The computer in accordance with claim 2 wherein said display time ratio is on the order of one half.

5. A computer comprising:

A. a processor for executing an application program and generating an output in response to said executed application program, said processor further generating a simulated keyboard independent of said executed application program;

B. a touch-sensitive display coupled to said processor for generating and displaying an output image and a simulated keyboard image;

C. user-actuater means provided by said touch-sensitive display for toggling between a full-screen display mode and a split-screen display mode;

D. control means coupled to said display for causing said display to generate and display
i) in said full-screen mode, a full-page image of said output comprising a predetermined plurality of lines;
ii) in said split-screen mode, a split-page image of said output in a first window and said simulated keyboard image in a second window, said split-page image comprising a portion of said predetermined plurality of lines of said full-page image; and
iii) a cursor at a selected position of said full-page image in said full-screen mode, said cursor, in response to said user-actuater means toggling to said second mode, automatically re-locating to a position in said split-page image corresponding to said selected position in said full-page image; and E. scrolling means for displaying the remaining portion of said predetermined plurality of lines of said full-page image within said split-page image, said scrolling means limited to displaying only said.

6. The computer in accordance with claim 5,

A. wherein, in association with a pre-selected period of time during which said simulated keyboard continues to be touched, said control means generates an electrical signal corresponding to a character;

B. wherein said processor receives said electrical signal, and causes said character to be displayed on said touch-sensitive display in response thereto, and C. said computer further comprises first user-actuated means coupled with said processor for adjusting auto-repeat delay, i.e., the length of said period of time while said simulated keyboard continues to be touched before said input device generates a second electrical signal that causes said character to be displayed for a second time; and second user-actuated means coupled with said processor, separate from said first means, for adjusting auto-repeat rate, i.e., the rate at which third, fourth, etc., electrical signals are generated while said input device continues to be touched to cause said character to be displayed successive times.

7. In a computer system having an interactive user interface comprising a display, and a touch-sensitive screen disposed over the display, a method for displaying on the display both an output image and a simulated keyboard image for use in entering data and commands via the touch-sensitive screen, the method comprising the steps of:

A) generating and displaying said output image for a first period of time and at a first luminous radiation intensity level having a predetermined persistence;

B) generating and displaying said simulated keyboard image for a second period of time and at a second luminous radiation intensity level having said predetermined persistence, the second period of time being shorter than the first period of time and said second intensity level being lower than said first intensity level, the ratio of the second period of time to the first period of time being a display time ratio; and C) repeatedly alternating generation and display of said output image and said simulated keyboard image according to said display time ratio such that said predetermined persistence of said luminous radiation causes said images to appear substantially continuously on said display.

8. The method in accordance with claim 7, wherein said display time ratio is on the order of one half.

9. The method in accordance with claim 7 further including the step of adjusting said display time ratio in response to a user-actuated control.

10. The method in accordance with claim 7, wherein the display comprises a liquid crystal display.

* * * * *